United States Patent
Larson et al.

(10) Patent No.: US 10,585,570 B2
(45) Date of Patent: Mar. 10, 2020

(54) AUTHOR SHARING AND RECIPIENT CREATION OF COPIED COLLABORATIVE CONTENT ITEMS

(71) Applicant: Dropbox, Inc., San Francisco, CA (US)

(72) Inventors: Erik Larson, San Francisco, CA (US); Shehzad Daredia, San Francisco, CA (US); Justin Hileman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 214 days.

(21) Appl. No.: 15/601,965

(22) Filed: May 22, 2017

(65) Prior Publication Data
US 2018/0335935 A1 Nov. 22, 2018

(51) Int. Cl.
| | | |
|---|---|---|
| *G06F 17/00* | (2019.01) | |
| *G06F 3/0484* | (2013.01) | |
| *G06Q 10/10* | (2012.01) | |
| *G06F 17/24* | (2006.01) | |

(52) U.S. Cl.
CPC .......... *G06F 3/04842* (2013.01); *G06F 17/24* (2013.01); *G06Q 10/101* (2013.01)

(58) Field of Classification Search
CPC .. G06F 3/04847; G06F 3/04842; G06F 17/24; G06F 17/248; G06F 17/2247; G06F 17/2288; G06F 17/211; G06F 17/30011; G06Q 10/101
USPC .......................................................... 715/202
See application file for complete search history.

(56) References Cited

U.S. PATENT DOCUMENTS

| | | | | |
|---|---|---|---|---|
| 9,413,739 | B1 * | 8/2016 | Rose | H04L 63/08 |
| 2008/0010629 | A1 * | 1/2008 | Berg | G06F 8/36 717/116 |
| 2008/0155430 | A1 * | 6/2008 | Prager | G06Q 10/10 715/751 |
| 2009/0271713 | A1 * | 10/2009 | Stull | G06Q 10/10 715/753 |
| 2011/0252312 | A1 * | 10/2011 | Lemonik | G06F 17/248 715/255 |
| 2014/0033067 | A1 * | 1/2014 | Pittenger | G06F 21/606 715/751 |
| 2014/0164352 | A1 * | 6/2014 | Denninghoff | H03H 9/02622 707/711 |

(Continued)

*Primary Examiner* — Jason T Edwards
(74) *Attorney, Agent, or Firm* — Fenwick & West LLP

(57) ABSTRACT

A collaborative content management system allows users to create, edit, and share collaborative content items among a plurality of other users. The system enables a collaboration event between author client devices and recipient client devices. During a collaboration event, a collaborative content item is created by an author. The collaborative content item is converted into a model collaborative content item and stored in the collaborative content management system. Access to the model collaborative content item is shared with recipient client devices. A derivative copy of the collaborative content item is generated based on the model collaborative content item, for instance in response to a request from a user of a recipient client device. The created derivative collaborative content items are editable by users corresponding to the derivative collaborative content item such that edits made to a first derivative collaborative content item are not accessible to other derivative collaborative content items.

19 Claims, 14 Drawing Sheets

(56) References Cited

U.S. PATENT DOCUMENTS

| | | | |
|---|---|---|---|
| 2014/0280596 A1* | 9/2014 | Cairns | G06F 17/24 709/204 |
| 2014/0281850 A1* | 9/2014 | Prakash | G06F 17/218 715/202 |
| 2014/0344658 A1* | 11/2014 | Srinivasan | G06F 17/2235 715/205 |

* cited by examiner

Draft Speech

Here is the draft of the speech. @Bill_Seward, @John_Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

New Comment...

Comments (6)

Edward Everett   12/15/10 at 11:05 pm
You say in two minutes what would take me two hours. Well done.

Bill Seward   12/15/10 at 11:10 pm
Certainly the bloodiest...
2 more comments

John Hay   12/15/10 at 11:1pm
What happened to "It is altogether fitting and proper that we should do this." ???
Reply George Bancroft   12/15/10 at 11:05 pm
I would like to use this in fundraising for soliders.
@Bill_Seward your thoughts?
Reply

FIG. 5A

Draft Speech ✏ ─531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived and so dedicated, can long endure. We are met on a great battle field of that war. We come to dedicate a portion of it, as a final resting place for those who died here, that the nation might live. This we may, in all propriety do.

But, in a larger sense, we can not dedicate — we can not consecrate — we can not hallow, this ground — The brave men, living and dead, who struggled here, have hallowed it, far above our poor power to add or detract. The world will little note, nor long remember what we say here; while it can never forget what they did here.

---

Share

Comments (7)

New Comment...

John Nicolay 12/16/10 at 8:25 am
I like this version better than the first draft @file
Reply

Edward Everett 12/15/10 at 11:05 pm
You say in two minutes what would take me two hours. Well done.

Bill Seward 12/15/10 at 11:10 pm
Certainly the bloodiest...
─ 2 more comments ─

John Hay 12/15/10 at 11:1pm
What happened to "It is altogether fitting and proper that we should do this." ???
Reply

George Bancroft 12/15/10 at 11:05 pm
I would like to use this in fundraising for soliders.
@Bill_Seward your thoughts?
Reply

Recent docs

Draft Speech
Shared with Edward Everrett and Bill Seward · You viewed 5 days ago

Draft Opinion: Gibbons v. Ogden
Shared with John Marshall · You viewed 7 days ago · Edited 7 days ago

A Brief History of Steel Production in Ohio
Shared with Robert Jackson · You viewed 10 days ago · Edited 11 days

Proposed Footnote for Carolene Products Opinion
Shared with Harlan F. Stone · You viewed 13 days ago · Edited 13 days

The Effects of Education on Interstate Commerce
Shared with William Rehnquist · You viewed 14 days ago · Edited 17 da

Draft Opinion: Gibbons v. Ogden
| | |
|---|---|
| John Marshall commented<br>How do you like this ending? | 1 day ago |
| John Marshall commented<br>The enumeration . . . | 2 days ago |
| John Marshall commented<br>Please edit this part | 2 days ago |

A Brief History of Steel Production in Ohio
| | |
|---|---|
| Robert Jackson commented<br>I see a zone of twilight. | 4 days ago |
| Robert Jackson commented<br>What does Hugo think about this? | 5 days ago |

Draft Speech
| | |
|---|---|
| George Bancroft commented<br>@Bill Seward your thoughts? | 5 days ago |

File Level Comments

John Nicolay   12/15/10 at 11:05 pm
I like this version better than the first draft George Bancroft   12/15/10 at 11:09 pm
Did anyone check the math re 4 score + 7? @file Reply

*FIG. 6A*

AUTHOR SHARING AND RECIPIENT CREATION OF COPIED COLLABORATIVE CONTENT ITEMS

TECHNICAL FIELD

The disclosed embodiments generally relate to managing document editing between users in collaborative content items over a network.

BACKGROUND

Online collaborative sharing of documents is typically provided by a network-based file sharing computer system that allows multiple users to access and edit the files. Generally, documents are created and edited by a specific type of native application, such as a word processor or spreadsheet application. Many such applications provide support for co-editing a single document among many users. In these applications, to limit editing within a shared document, users can restrict permissions for the shared document, and other users can launch a 'read-only' version of the document that can subsequently be saved and edited by the other users. Many such applications also provide support for tracking comments or other forms of annotation made to portions of a file, metadata associated with the file, or differences between the two saved files. However, existing systems do not provide functionality that enables users to bypass the step of manually saving a copy of a read-only file before editing is allowed. Additionally, these systems do not allow for the limiting of each users' edits to the file to the user that made the edits (e.g., such that each user's edits are not visible to any other user).

SUMMARY

A collaborative content management system allows users to create, edit, and share, collaborative content items among a plurality of other users and user accounts. A collaborative content item can include various types of content elements such as text, images or other multi-media, tables, etc. Users can communicate with the collaborative content management system using a client application on a client device or through a web application. The client application provides an interface for users to access collaborative content items on the collaborative content management system, edit such collaborative content items, comment on collaborative content items and share collaborative content items with other users.

In one embodiment, the collaborative content management system enables an author to create an original collaborative content item. The author can create a model collaborative content item (a version of the original collaborative content item suitable for distribution) from the original collaborative content item using the collaborative content management system. The author can provide access to the model collaborative content item to recipient users (or user accounts) using the collaborative content management system. The author and the recipients can each be associated with at least one user account and client device. Likewise, each client device accessing the collaborative content management system can be associated with at least one user account and user. In one embodiment, the author provides access to the model collaborative content item by sharing a hyperlink corresponding to the model collaborative content item with users or user accounts within the collaborative content management system, while in other embodiments, users can search within the collaborative content management to identify model collaborative content items.

For each user that requests access to the model collaborative content item within the collaborative content management system, a corresponding derivative collaborative content item can be created by the collaborative content management system based on a set of rules associated with the model collaborative content item. In one embodiment, the derivative collaborative content item is associated with a user account of the collaborative content management system. The derivative collaborative content item is stored by the collaborative content management system, for instance in association with the user account of the requesting user.

One or more edits to a derivative collaborative content item is received from an associated user of the collaborative content management system. For each edit received, the collaborative content management system can apply the edits to the derivative collaborative content item. The edits are applied such that the applied edits are not visible to users viewing other derivative collaborative content items created based on the same model collaborative content item.

In one embodiment, the creation of the model collaborative content item results in the modification of metadata associated with the original collaborative content item based on the set of rules used to create the model collaborative content item. The set of rules can identify metadata (for instance, metadata portions or types) and can identify modifications to the identified portions. Such modifications can include modifications to metadata associated with one or more of the requesting collaboration content management system accounts, the author, the model collaborative content item, the first user, or metadata associated with the original collaborative content item. In one particular embodiment, the set of rules identifies a set of protected metadata associated with the author and removes or obfuscates the set of protected metadata from the modified collaborative content item. In one embodiment, the collaborative content management system can add a set of classification metadata to the modified collaborative content item.

In one embodiment, when storing the original collaborative content item, the collaborative content management system creates a set of document tags associated with the original collaborative content item based on the content of the original collaborative content item, and stores the set of tags in association with the original collaborative content item. The document tags can additionally be created based on metadata associated with the original collaborative content item or input from the author. The document tags are indexed within the collaborative content management system such that the collaborative content management system is searchable using the document tags.

In one embodiment, model collaborative content items can be suggested to users of the collaborative management system based on metadata associated with the model collaborative content item and metadata associated with the user.

In one embodiment, comments associated with a derivative collaborative content item can be created for, stored with, applied to, and associated with the derivative collaborative content item such that the comments are accessible by other users (or user accounts) associated with the derivative collaborative content item. In one particular embodiment, comments associated with a derivative collaborative content item can be accessed by the author of the original collaborative content item from which the derivative collaborative content item was created.

In one embodiment, the author can edit the original collaborative content item using the collaborative content management system. The author edits can be applied to derivative collaborative content items, for instance in embodiments in which users associated with the derivative collaborative content items opt in to automatically receiving author edits or manually accept and receive author edits.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5A shows an example user interface of a collaborative content item page including various comments.

FIG. 5B shows an example user interface with a file-level comment associated with the title of the collaborative content item.

FIG. 6A shows an example user interface with a plurality of collaborative content items, a list of notifications, and file level comments.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
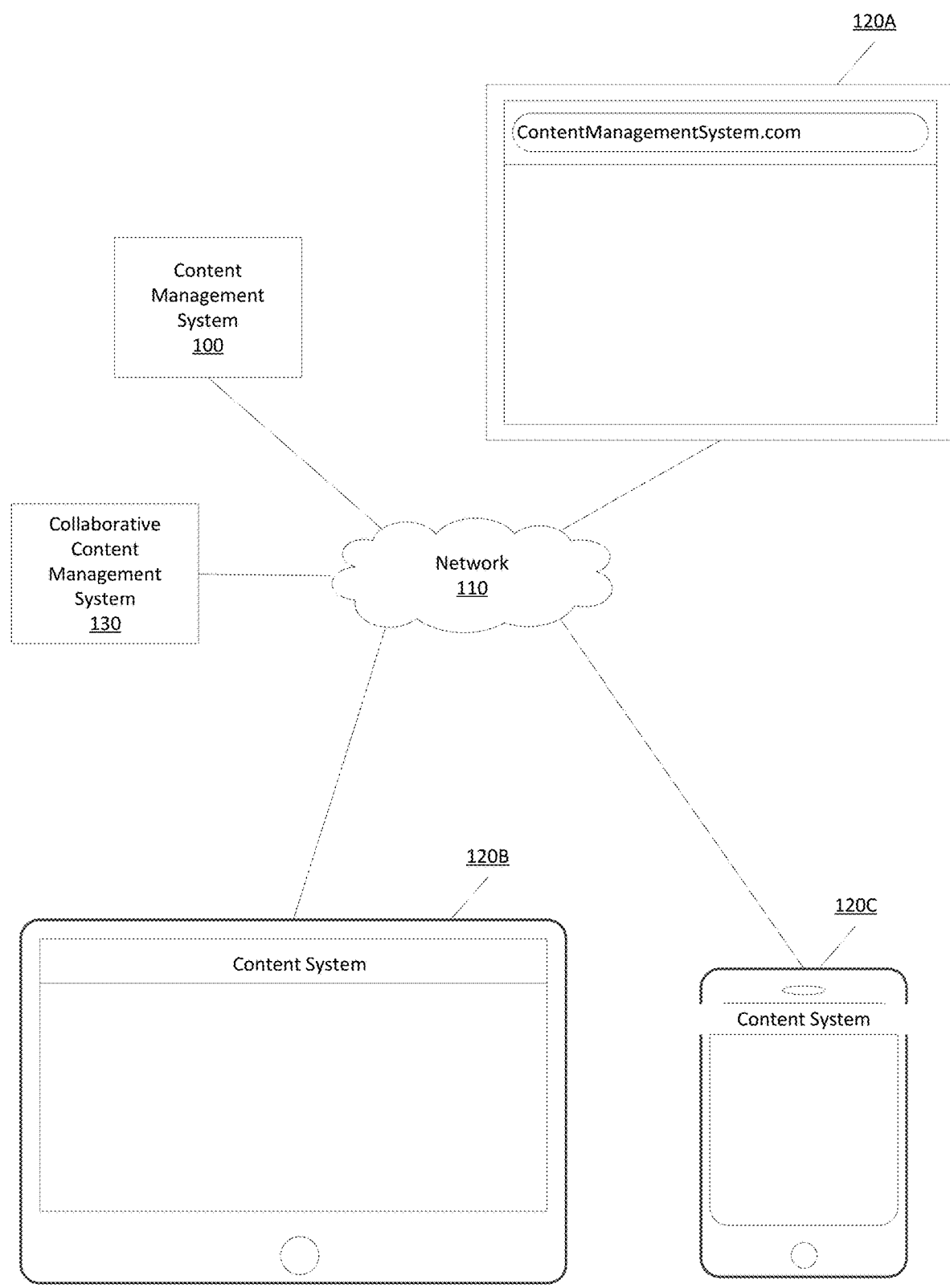
FIG. 1 shows a diagram of a system environment of a content management system and a collaborative content management system according to one embodiment.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
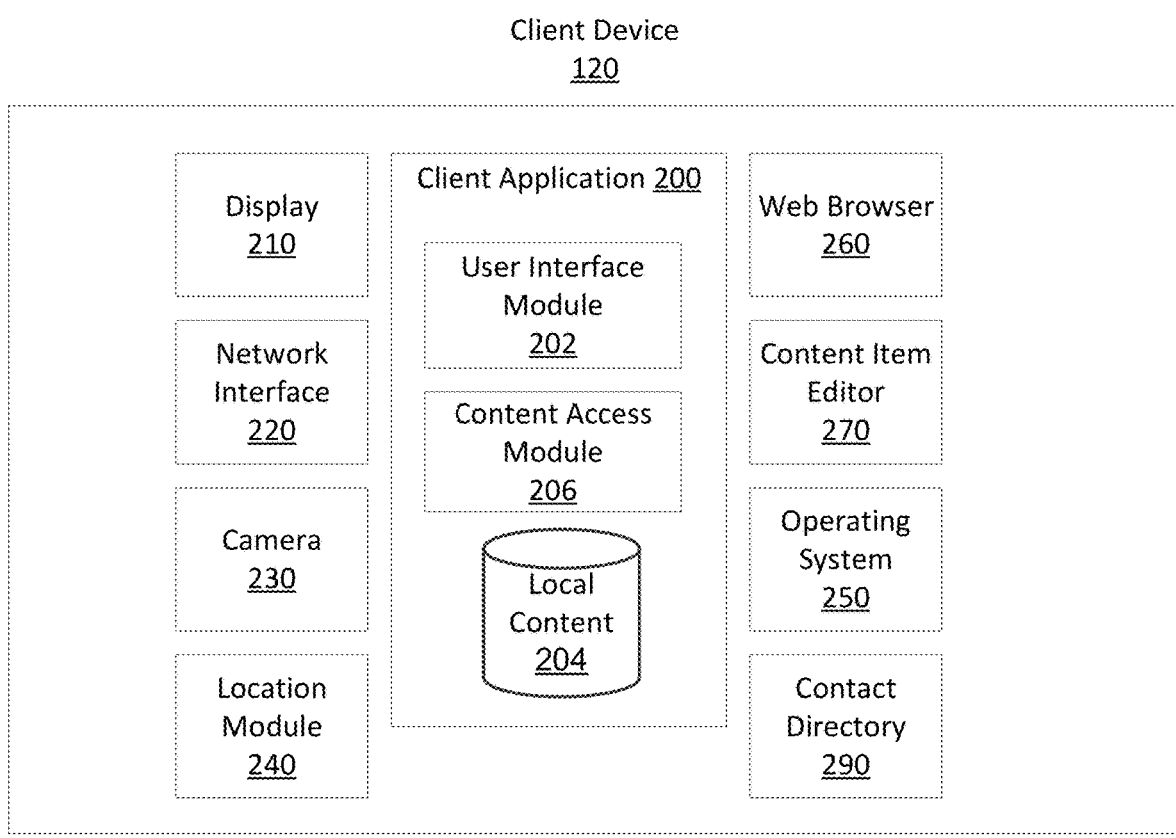
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
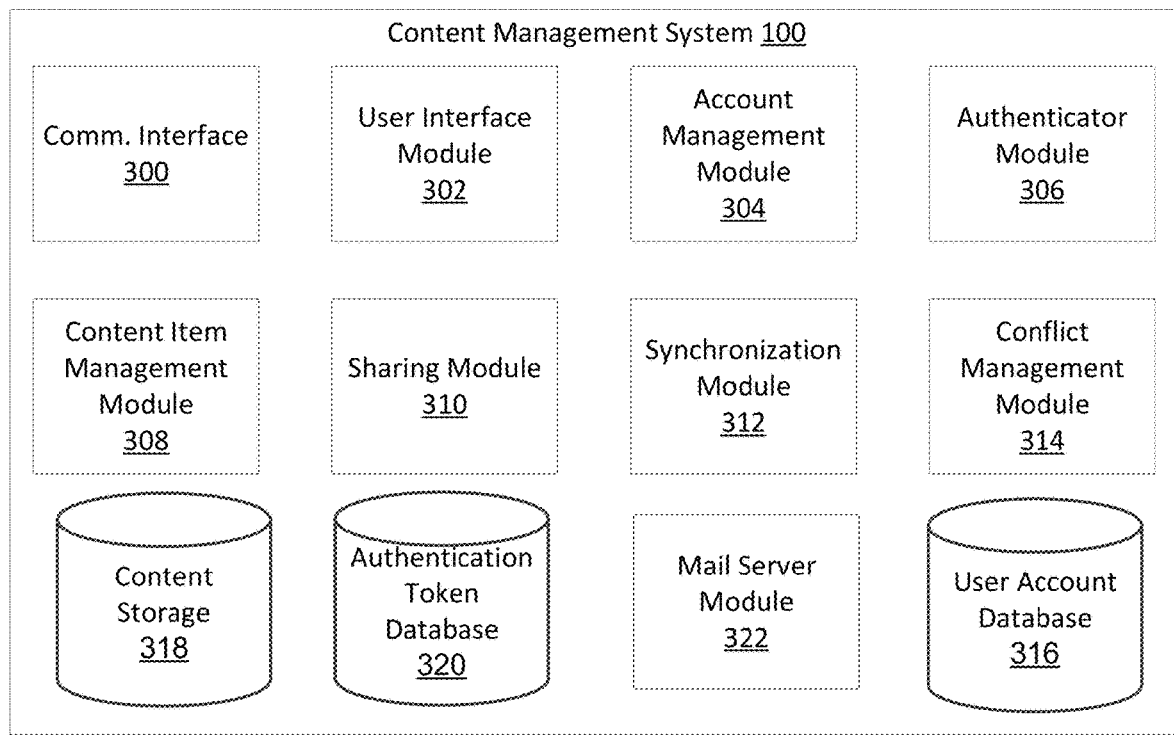
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320.

After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
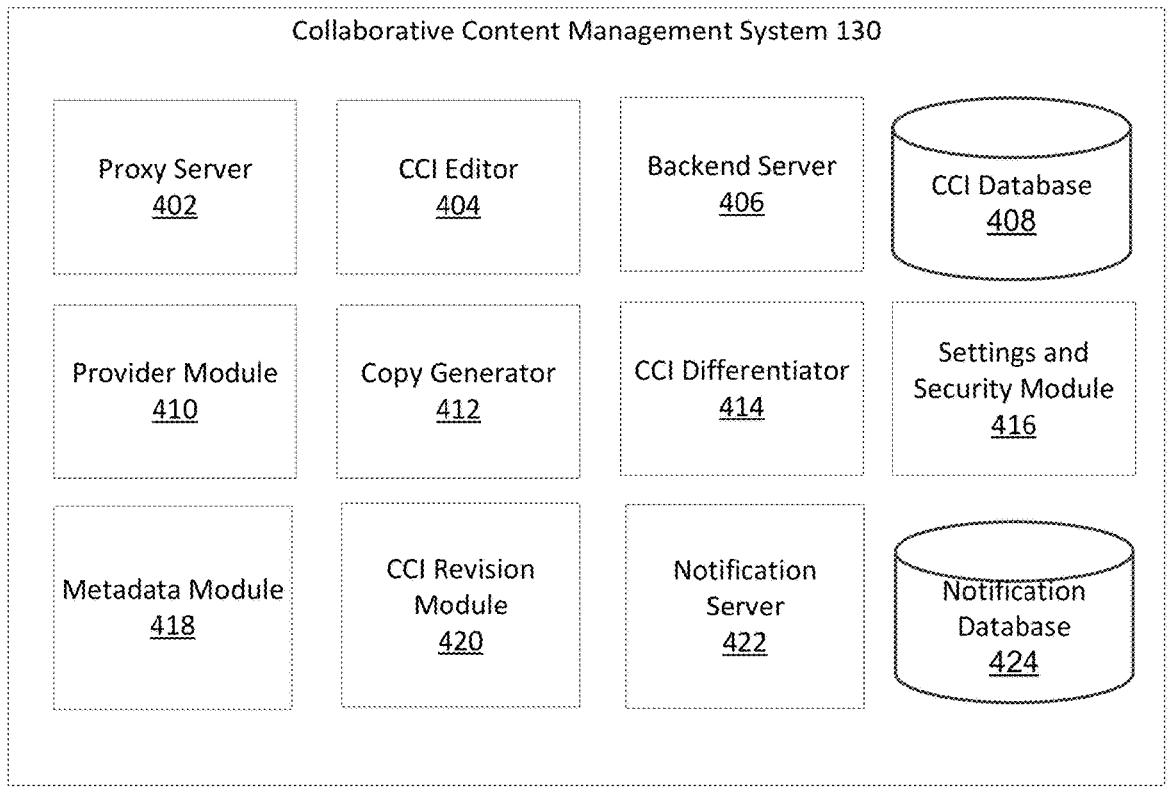
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The provider module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Referring now to FIG. 5A, there is shown an example user interface with page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In one embodiment, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504d. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In one embodiment, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In addition the collaborative content item audience primitive, other contextual primitives may be implemented:

The "@folder" primitive informs the collaborative content management system 130 that all users with access to the folder that includes the collaborative content item should be able to view the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience_list of those threads the audience list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-Level Comment Interfaces

The collaborative content management system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure, as discussed with regard to FIG. 7. However, file-level comments are not associated with a span of the collaborative content item and are instead associated with the entirely of the content item. Despite these differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIG. 5B illustrates an embodiment for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 528, "@file", to indicate that a comment is file-level comment rather than a content level comment.

User Interface for Displaying a List of Notifications

FIG. 6 shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, the collaborative content management system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items, the collaborative content management system 130 generates a notification of the change. The collaborative content management system 130 defines one or more triggering actions. A triggering action is a change made by another user that causes the collaborative content management system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from the collaborative content management system 130 and can display a notification in a variety of ways. One way of displaying a notification is the notification list 604 shown in FIG. 6. The notification list 604 includes notifications for several of the viewing user's collaborative content items, and it is displayed when the viewing user selects the notification icon 614. In the example shown in FIG. 6, the notifications in the notification list 604 are sorted by the age of collaborative content item, and the notifications for each collaborative content item are sorted from most recent to least recent.

The client application 200 displays each notification in the notification list 604 with notification text and a short phrase indicating whether the notification relates to a comment or a portion of text in the collaborative content item content. Although not explicitly shown in FIG. 6, each notification can also include a content span and a notification link. The content span associates the notification with a span of content in a collaborative content item 502. The notification link is a link to the collaborative content item and includes a pointer to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification text is the user primitive "@Bill Seward" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In one embodiment, the user primitive takes the form of @username where the "@" symbol is a predetermined token that indicates to the collaborative content management system 130 that the following string "username" is the user name of a system user. In some implementations, other predetermined tokens can be used to indicate a primitive. If the user selects this notification 616, the notification link causes the client application

200 to open the collaborative content item 502 shown in FIG. 5A to a position where the span 510b is visible.

If the notification is generated in response to a file-level comment, the file-level comment may have no associated span in the associated collaborative content item or may set the span to be the collaborative content item title. The link included in the notification may open the collaborative content item displaying the beginning of the content or the title. [0090] In addition to displaying notifications for file-level comments in notification list 604, the client application 200 may also display a file-level thread pane 618, which displays file-level comment threads corresponding to a selected collaborative content item 620. In some implementations, file-level thread pane 618 can display file-level comment threads corresponding to multiple selected collaborative content items. In some implementations, file level thread pane 618 can display file-level comment threads corresponding to multiple of collaborative content items 606, whether or not the collaborative content items are selected. In the illustrated example, file-level comments from the collaborative content item titled "Draft Speech" are displayed in the file-level thread pane 618. In some embodiments, users may utilize the file-level thread pane 618 to add or reply to file-level comments without opening the associated collaborative content item. [0091] In various implementations, any of collaborative content items, the associated comments, or collaborative content item file structure and other metadata can be locally stored on a client device. For example, content can be downloaded from the collaborative content management system 130 for use in an offline mode. The inclusion of a file-level thread pane 618 may be especially beneficial for this offline use where file-level comments may be downloaded for offline viewing in the file-level thread pane 618. This would allow users to receive some information about collaborative content items without having to store the enter contents of the collaborative content items locally. For example, users may view file-level comments for collaborative content items listed in file-level thread pane 618, without requiring the collaborative content items to also be locally stored.

Database Structures

Figure 6B:
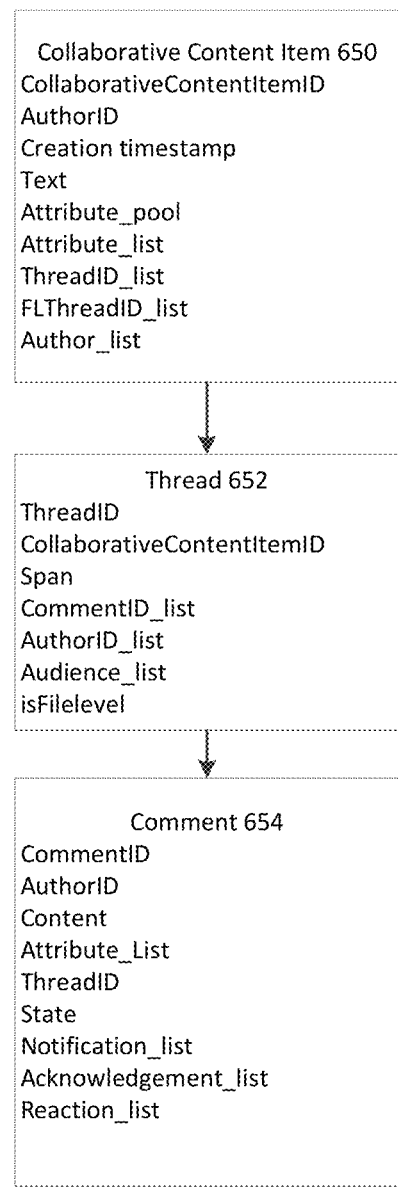
FIG. 6B shows an embodiment of the data structures for collaborative content items, comments, and comment threads.

Referring to FIG. 6B, collaborative content item database 408 (CCI database) stores the collaborative content items, content level and file-level comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from the content management system 100. In this case, folders would be saved as an additional data structure in the CCI database 408.

Each collaborative content item data element 650 is composed of a number of elements. In one embodiment, the elements are as follows:

CollaborativeContentItemID: a unique identifier assigned by the collaborative content management system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item is represented as string of ASCII characters.

Attribute_pool: Formatting attributes (e.g., bold, underline, italics, font, font size, line spacing, paragraphs, and the like) that are used in the collaborative content item. The attribute pool is a set of attributeIDs used in the collaborative content item; a native set of attributeIDs and associated formats are provided by the collaborative content management system 130. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single Space |
| 8 | Doublespace |
| ... | ... |

Attribute_list: Formatting attributes are applied to portions of a content item, such as text, by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10-0, 4-1, 2-0, 6-2, 6-0, 11=1 2, 12=0}.

ThreadID_list: a list of all threads that are associated with a collaborative content item. ThreadIDs in the ThreadID_list may represent threads of content level comments or threads of file-level comments.

FLThreadID_list: a list of all file-level threads 528 that are associated with a collaborative content item. Thus, the FLThread_list contains a subset of the threads in Thread ID list.

Author_list: a sequential list of the users who have contributed to the collaborative content item text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 652 is composed of a number of elements. In one embodiment thread data element 652 includes the following elements:

ThreadID: unique identifier assigned by the collaborative content management system.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in an image can be defined by a bounding region, for example a set of (X,Y) coordinates, relative to the image origin that define a polygon within the region; a span in a spreadsheet can be defined by a range of cells by column and row numbers. For example, the span (50, 25) indicates a text portion starting at character position 50 within the collaborative content item and running 25 characters in length. As the content in the collaborative content item is edited, the collaborative content management system 130 updates the span element of each thread. For example, if a five-character portion of the text before the span (50, 25) is deleted, then the content management system will modify the span of the thread to (45, 25). It is also possible for users to delete text included in the span. If all of the text included in the span of a thread is deleted, then the span will have a null value and is removed by the collaborative content management system 130 (unless isFilelevel is True as described below).

In some implementations, only content level comments are associated with a span, in this case a thread of file-level comments may have a null value for a span accompanied by a True value for the is Filelevel element. This is one mechanism for a thread of comments to persist in the CCI database 408 until the thread of comments is deleted, no matter what other content in the collaborative content item is removed or edited. For example, the title of a collaborative content item can be modified (e.g., edited or deleted). This change may not affect the file-level comment, even though file-level comment can be displayed as being associated with the collaborative content item title. For example, if a collaborative content item title is deleted, a file-level comment can remain attached to a field or other designated title location within the collaborative content item. As another example, a user can edit a collaborative content item title. A file-level comment can remain attached to a designated title location within the collaborative content item that contains the edited collaborative content item title.

CommentID_list: a list element of commentIDs of the comment data elements (e.g., comment data elements 654) included in the thread corresponding to thread data element 652.

AuthorID_list: a list of userIDs of the authors of comments in the thread.

Audience_list. The Audience_list element is a list indicating the users to whom the thread and its comments are displayed when accessing the collaborative content item, and to whom notifications of changes in the thread are sent. The audience for a thread can be determined differently for file-level comments than for content level comments. In various implementations, the audience of a content level thread may comprise one or more of the userIDs of the i) the author of the collaborative content item containing the thread; ii) the authors of comments included in the thread; iii) the authors of any text included in the span for the thread; iv) any user mentioned in the span the thread via a user primitive (further described below); v) any user mentioned in a comment via user primitive; vi) any user who has opened the collaborative content item; vii) any user who has edited the collaborative content item; or viii) any user who has created an association with the collaborative content item, such as by marking it as a favorite or followed collaborative content item. In some implementations, an audience for the thread may not be defined specifically for the thread, but instead may be identified dynamically as needed based on, e.g., user identifiers associated with the comments or with the collaborative content item. The inclusion of an audience for each thread allows for control of which users are notified of, and have access to specific comments as further described below.

isFilelevel: a value indicating whether the thread is a file-level thread (associated with the collaborative content item as a whole as opposed to a particular span) or whether the thread is a content level thread (associated with a particular span in the collaborative content item). Before deleting a content level thread for having a null span, the collaborative content management system 130 checks the isFilelevel value for the thread to determine whether it should be deleted. If isFilelevel is True, the thread will not be deleted. The isFilelevel element is also used to determine how a thread is displayed. If isFilelevel is True the thread is displayed in the collaborative content item as a file-level thread with no associated span. If isFilelevel is False then the thread is displayed as a content level thread and the associated span is highlighted in the collaborative content item.

Each comment data element 654 is composed of a number of elements. In one embodiment, comment data element 654 includes the following elements:

CommentID: a unique identifier assigned by the collaborative content management system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the threadID of the thread to which the comment belongs.

State: an enumerated variable storing a value indicating the state of the comment as either active or resolved.

Notification_list: the Notification_list element is a list of userIDs indicating the users to whom a notification of the comment has been sent, as further explained below. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. In various implementations, this list can be updated whenever the collaborative content editor 404 displays the comment to a user that has not yet seen the new comment or when a user selects a control in relation to a comment indicating the user's acknowledgement of the comment or the user's intention to respond to the comment. In some embodiments, the collaborative content editor 404 may display a visual indication of users that have viewed a particular comment proximate to the comment in the display. Additionally, the collaborative content management system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content editor 404 displays a visual indication of each reaction proximate to the comment in the display.

User information is also stored as database entities. Each user includes the following elements:

DocumentID_List: a list of collaborative content item identifiers accessible by the user of the user identifier.

RoomID_List: a list of room identifiers of comment rooms accessible by the user of the user identifier. A user may have access to multiple comment rooms for a single collaborative content item.

AnonymousUserID_list: a list of anonymous user identifiers associated with the user. An anonymous user identifier for the user may be generated for each of the collaborative content items based on the user identifier of the user and the document identifier of the collaborative content item. In some embodiments, anonymous user identifiers are not stored by the system, but instead are reconstructed based on the stored user identifier and document identifier.

ThreadID_list: a list of threads in which the user has posted a comment, or is otherwise allowed to access.

Avatar: an identifier that references an avatar, such as an image, associated with the user. The avatar is used as a representation of the user. The avatar may be presented when the user provides a comment or updates a collaborative content item to attribute changes to the user.

AnonymousAvatars_list: a list of anonymous avatars associated with anonymous user identifiers of the user. Each anonymous user identifier may be associated with a different anonymous avatar identifier. In some embodiments, anonymous avatars are not stored in association with users, but instead are referenced by the anonymous user identifier.

CCI database 408 may also include a set of indices. These indices are logical in nature and may be implemented in various ways, depending on the underlying database design. A user index contains a list of all users by their userID, and for each userID there is a list of collaborativeContentItemIDs. Each collaborativeContentItemID identifies a collaborative content item to which the user of the userID is associated and has access to. For each collaborativeContentItemID, there is a status indicator that indicates whether the collaborative content item is active or inactive for the user. A collaborative content item is active for the user sharing the collaborative content item until the user deletes the collaborative content item. In one embodiment, when the user deletes the collaborative content item, the collaborative content item persists in the collaborative content item database 408 remains associated with the user but status indicator is set to inactive, allowing the user to reactivate their sharing status with the collaborative content item in the future. The collaborative content item remains active for and associated with any other shared users. Alternatively, the collaborative content item may be deleted from the item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each document that the user is associated with. A value stored with each collaborativeContentItemID in the index indicates whether the user has editing privileges, viewing privileges, and/or sharing privileges.

Collaborative content item database 408 can include a collaborative content item index. The collaborative content item index indicates, for each document, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index Collaboration Content Event As used herein, a "collaboration event" refers to the use of the collaborative content management system 130 by a plurality of users to share, create, edit, or use a collaborative content item. One example of a collaboration event includes the use of the content management system 100 to distribute an author-generated collaborative content item to a plurality of recipients. FIG. 1 is a flow chart broadly illustrating a collaboration event 700, with elements of the collaboration event 700 described in more detail in regards to FIGS. 9-12.

For consistency, the description generally describes the operation and interactions of and between client devices in a collaboration event. However, it should be noted that each client device can be associated with a user account, and that actions can be taken by a user, via a client device, and in association with the user account. Likewise, multiple users may share a client device and/or a user account, and one or more users may be associated with multiple client devices and multiple user accounts. Accordingly, with regards to an action taken in association with a collaboration event, reference may be made to the performance of the action by a client device, by a user account, or by a user for the purposes of simplicity and without loss of generality. Likewise, reference to the performance of an action in association with one client device, one user account, or one user may apply to the performance of an action in association with multiple client devices, multiple user accounts, or multiple users, respectively. Generally, each client device 120 is associated with a user account, e.g. an author client device is associated with an author user account. Often each user account is associated with a user and the user interacts with the client device 120 causing the client device 120 (or associated user account) to take actions within the content management system 100. However, client devices 120 and user accounts can also take actions without explicit input from a user.

An example of a collaboration event 700 includes a prominent content creator (i.e., an "influencer") sharing collaborative content items with client devices (or user accounts) interested in the content (e.g., followers) created by the influencer. For example, the influencer can be a musician who is on a concert tour. Every night, the influencer creates an original collaborative content item with the set-list for the night's concert using the collaborative content management system. The influencer can provide the original collaborative content item as a model collaborative content item (for instance, via a link to the model collaborative content item) to all of the influencer's followers. The followers can create a derivative collaborative content item (for instance, by selecting the link to create a derivative copy of the model collaborative content item) that can be included in their collaborative content management system user account. The derivative copy of the collaborative content item is editable only by a user account (or associated user or client devices) based on a set of rules defining the write permissions associated with the derivative collaborative content item. The edits made by the user account are not reflected on any other derivative copy generated from the modified collaborative content item (e.g. collaborative content items generated for other followers that selected the link). This allows each follower to independently see and interact with the influencer's collaborative content items, while preventing the edits of one follower from being visible to any other follower.

Returning to FIG. 7, in a collaboration event, an author client device (or author user account) creates 710 an original collaborative content item (i.e., an "o-CCI") using the content management system 130. The author client device interacts with the collaborative content management system to create 720 a modified collaborative content item (i.e., a "m-CCI"). The m-CCI can be a copy of the o-CCI at the time the m-CCI is created, and can be stored in the CCMS. The author provides access to the m-CCI to recipient client devices (or user accounts) via the network 110 (e.g., a hyper-link). The recipient client devices can create 730 a derivative copy collaborative content item (d-CCI) of the o-CCI from the m-CCI for each recipient client device (e.g. recipient client devices that select the hyper-link). The d-CCI is a partial or exact duplicate of the m-CCI (i.e. the o-CCI at the time the m-CCI was created). The client devices can edit 740 the d-CCI. At a future point, the author client device can edit 750 the o-CCI. At this point the author client device can create 720 an m-CCI of the edited o-CCI (e.g., a new access link) to recipient client devices to access the edited m-CCI, or can push the edits to the d-CCI for one or more client devices (for instance, client devices that have opted-in to having o-CCI edits automatically applied or synched to the d-CCI). Similarly to steps 730 and 740, the recipient client devices can create a new d-CCI from the edited o-CCI and collaboratively edit the new d-CCI.

Figure 7:
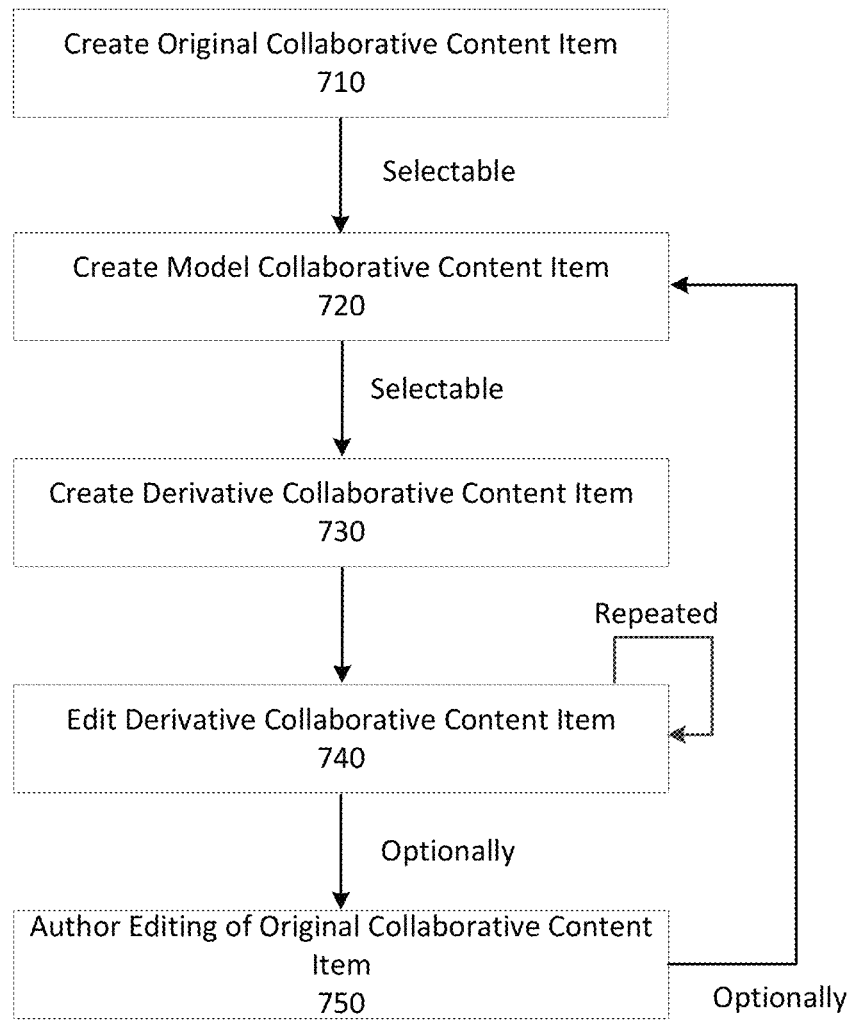
FIG. 7 is a flow chart illustrating a collaboration event, according to one example embodiment.
Figure 8A:
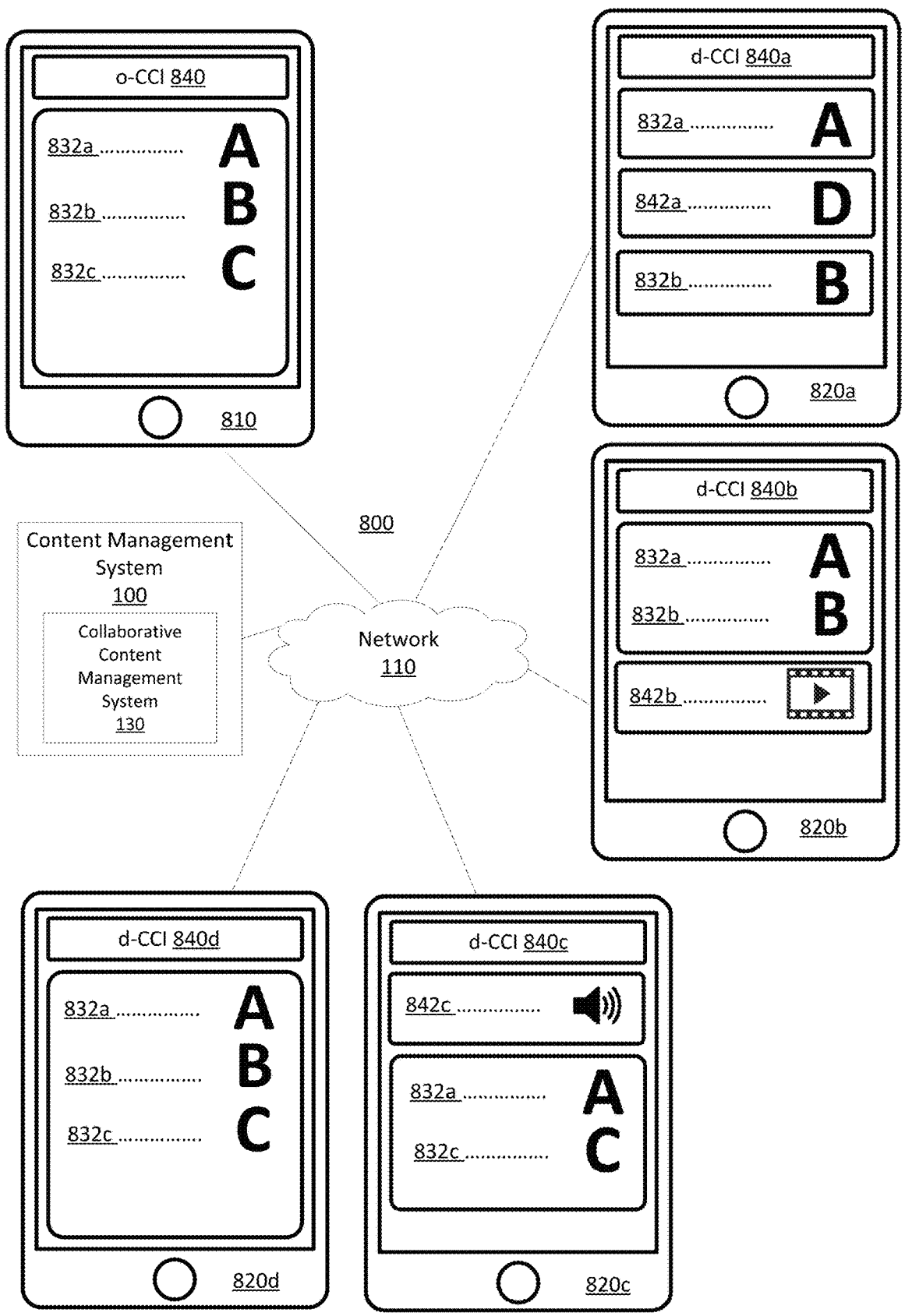
FIGS. 8A and 8B show a collaboration event between an author client device and recipient client devices in a collaboration environment, according to one example embodiment.
Figure 8B:
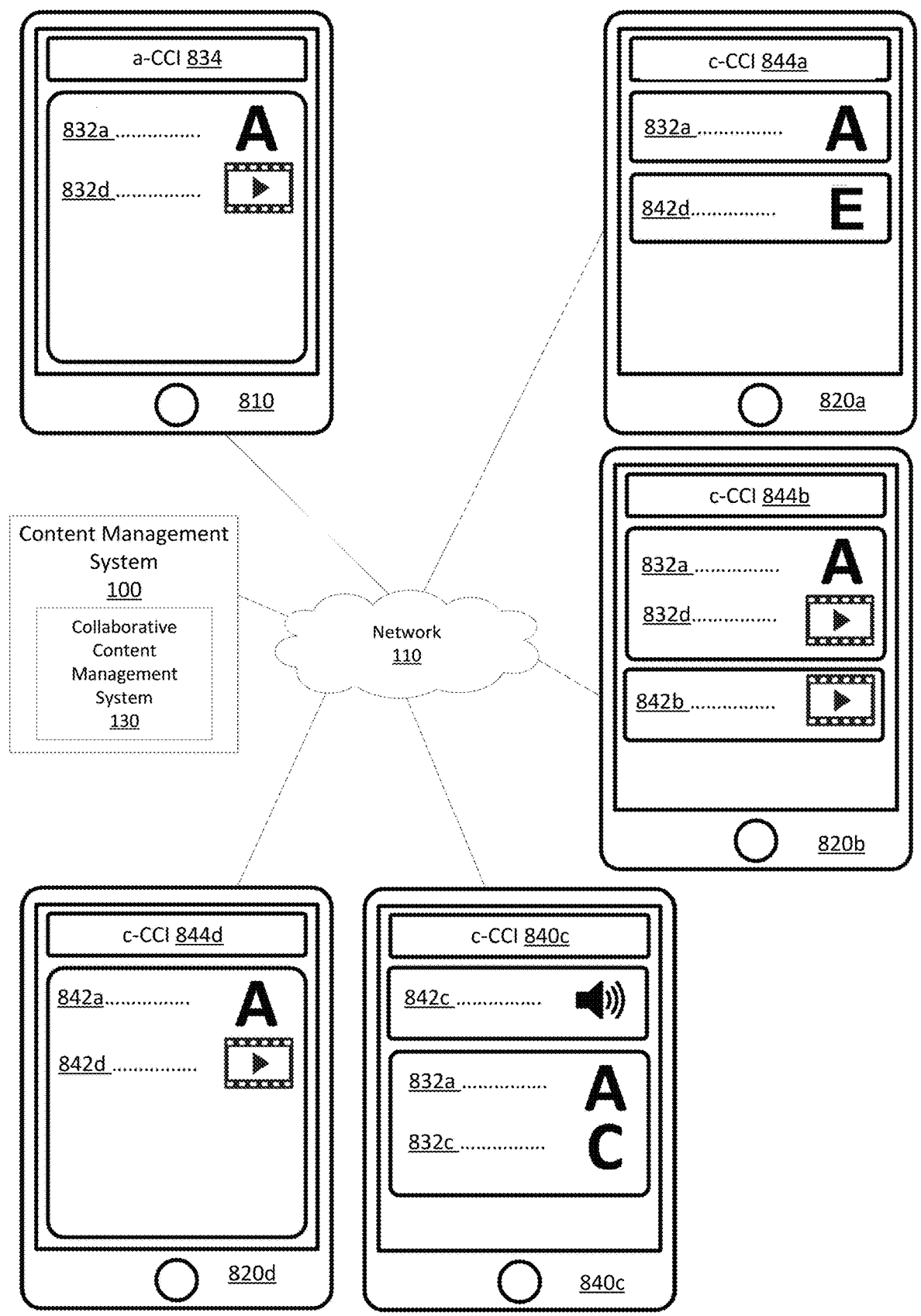

To illustrate the above method of FIG. 7, FIGS. 8A-8B show a collaboration event 700 between an author client device 810 and recipient client devices 820 in a collaboration environment. In the illustrated collaboration event 700, the collaborative content management system 130 (CCMS) is stored in the content management system 100 as previously described. Generally, each client device is associated with a user account of the content management system 100.

Referring to FIG. 8A, the author client device 810 creates 710 an original collaborative content item (o-CCI) 830 including original content elements 832a-c and stores the o-CCI 830 in the content management system 100. In this example, the original content elements are textual items. The author client device creates a m-CCI 720 and provides the an access link to the m-CCI to the recipient client devices 820a-d via the network 110. The recipient client devices 820a-d select the access link and the CCMS 130 creates 730 a derivative copy (d-CCI) 840a-d of the o-CCI 630 (via the m-CCI) for each client device 820a-d that selected the link. The d-CCI 840a-d for each client device 820a-d is stored in the CCMS 130. Each client device can access the stored d-CCI via the network 110 and edit 740 the d-CCI with recipient content elements 842a-c.

For example, the first recipient client device 820a edits 740 the d-CCI 840a by removing an original content element 832c and inserting a recipient content element 842a between the original content elements 832a and 832b. In this example, the recipient content element is a textual content element. The second recipient client device 820b edits 740 the d-CCI by removing an original content element 832c and adding a recipient content element 842b, a playable media element. The third recipient client device 820c edits 740 the d-CCI by removing an original content element 832b and inserting a recipient content element 842c, a playable audio element. The fourth recipient client device 820d accesses the d-CCI but does not edit the d-CCI. The recipient client devices can send the edits to the CCMS 130 which applies the edits the stored d-CCI 840a-d for each client device 820a-d, respectively. Importantly, for each received collaborative edit, the received edits are applied only to the d-CCI corresponding to the recipient client device 840 (or associated user account) from which the set of edits was received. Alternatively stated, in this example, the set of collaborative edits received from each recipient client device are not applied to the d-CCI corresponding to any other non-associated recipient client device (e.g. the edits from recipient client device 820a are not applied to the d-CCI 840b associated with a different client device 820b).

Moving forward, and referring to FIG. 8B, the author client device 810 accesses the stored o-CCI and edits 750 the content elements 832 of the o-CCI to create an edited a-CCI 834. In the illustrated example the author edits the o-CCI by removing two textual original content elements, i.e. 832b-c from FIG. 6A, and adding a video original content element 832d. The author client device creates 720 a m-CCI of the edited o-CCI and provides the access link to the edited m-CCI 834 to the recipient client devices 820 via the network. The recipient client devices 820a-d can select the access link and the CCMS 130 creates 730 a new d-CCI 844 reflective of the edited o-CCI 834 for each client device which selected the link. The created 730 d-CCI 844 for each client device 820 that selects the access link is stored in the CCMS 130. Each client device 820 can access the stored d-CCI via the network and edit 740 their respective d-CCI.

For example, the first recipient client device 820a edits the d-CCI by removing an original content element 832a and inserting a recipient content element 842d. In this example, the recipient content element 842d is a textual content element. The second recipient client device 820b does not edit the new d-CCI 844b, but the previously inserted recipient content element 842b is maintained. The third recipient client device 820c did not select the provided 510 link and did not create a new d-CCI; thus, the d-CCI 840c of the third client device is not a d-CCI of the edited o-CCI. The fourth recipient client device 820d accesses the d-CCI but does not edit 530 the d-CCI, thus the d-CCI on the fourth recipient client device 820d is equivalent to the o-CCI. Similarly to FIG. 8A, the recipient client devices can send the edits, when applicable, to the CCMS 130 which applies the edits the stored d-CCI for each client device.

The description of the collaboration event 700 of FIG. 7 and FIGS. 8A-8B can be representative of any aspect of the collaborative content management system 130 and content management system 100. The collaboration event can take place among any number of author client devices and recipient client devices. Further, the client devices can execute the steps of FIG. 7 in any order and any number of times. Finally, author client devices can create any number of o-CCIs, edit each o-CCI any number of times, and create any number of m-CCIs any number of times.

FIG. 7 and FIGS. 8A-8B are given as a general depiction of a collaboration event 700. Moving forward, the system is described using an example of a collaboration event. In the described use case, Dr. Rachel uses the author client device, and Chris, Zach, Toney, and Andrew use the recipient client devices in the collaboration event. Dr. Rachel, Chris, Zach, Toney, and Andrew are all associated with a user account, and each user account is associated with the client device 120 each person is using.

Create Model Collaborative Content Item

Figure 9:
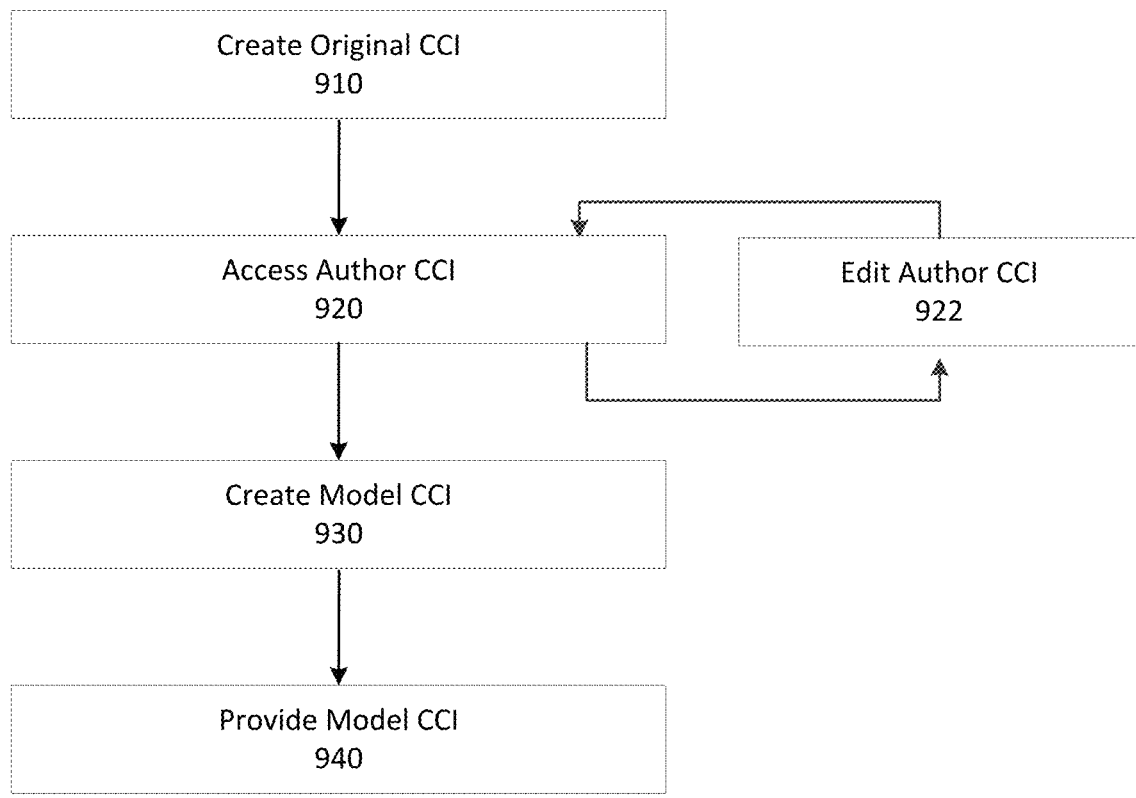
FIG. 9 is a flow chart illustrating the providing of an access link to a recipient device, according to one example embodiment.

To begin, FIG. 9 is a flow-chart illustrating a process of creating 710 an original collaborative content item and creating a model collaborative content item 720 from the original collaborative content item. An author client device creates 910 an original collaborative content item (o-CCI) using the user interface module 202 to access the collaborative content item editor 404 of the collaborative content management system 130. The o-CCI can include content elements from the local content 204 stored on the author client device or can include content elements created by the CCI editor 404. The author client device can store the o-CCI on the CCI database 408. In some embodiments, storing the o-CCI on the CCI database 408 assigns a unique identifier to the o-CCI and a content pointer for the location of the o-CCI within the CCI database 408.

As an example, Dr. Rachel has encountered a new virus in the remote jungles of Asia. Dr. Rachel's client device accesses the CCMS 130 and creates 910 an original collaborative content item. Dr. Rachel's client device uses the CCI editor 404 to include textual original content elements regarding the virus' characteristics and spread patterns. Dr. Rachel's client device saves the o-CCI to the CCI database 408 with the unique identifier "New Virus." The CCMS 130 can provide Dr. Rachel's device with a content pointer for the o-CCI so that it may access the o-CCI as she continues her exploration.

Returning to FIG. 9, at any point the author client device can access 920 the o-CCI using the identification information of the o-CCI (i.e. the unique identifier and/or content pointer), edit 922 the o-CCI by adding or removing content elements to or from the o-CCI using the CCI editor 404, and store the edited o-CCI in CCI database 408.

Continuing the example, as Dr. Rachel wanders the jungles of Asia studying the new virus, she learns new information regarding the genetic make-up of the virus. Dr. Rachel's device accesses the o-CCI "New Virus" from the CCI database 408 using the content pointer. Dr. Rachel's device adds original content elements to the o-CCI describing her findings and saves the o-CCI. In this case Dr. Rachel's device adds a voice recording interviewing a patient who has the virus and a video including symptoms of the virus to the o-CCI.

Returning to FIG. 9, the author client device can access 920 the o-CCI and create 930 a model collaborative content item for the o-CCI using the copy generator 412. The author client device can provide the m-CCI to recipient client devices using the access module 410. The author client device can provides 940 the m-CCI to recipient client devices via the network 110 using the access link module 410. In one embodiment, the author client device provides the m-CCI to recipient client devices using an access link. The access link can include the identification information for the o-CCI within the CCI database. Generally, the access link is a hyperlink but can also be any other element that can provide the location of the o-CCI within the CCI database including a CCI identifier, a selectable GUI element, an encryption key, or any suitable access link. Providing 940 the m-CCI link can occur via any number of networks or methods, e.g. sending the m-CCI or link to the m-CCI via SMS message, email, network message; displaying the m-CCI or link the m-CCI within a dashboard of a recipient's user account, etc. Further, the access module 410 can configure the m-CCI to be provided for use in any type of network or to be accessible by any type of client device.

For example, Dr. Rachel finds a village of people in the jungles of Asia that are unresponsive to treatment for the virus. Dr. Rachel's device accesses the o-CCI, edits 722 the new findings into the "New Virus" o-CCI, and saves the updated o-CCI. Dr. Rachel determines that she can no longer study this disease on her own and decides to enlist help. Dr. Rachel's client device accesses the current version of the "New Virus" o-CCI and generates 930 a m-CCI of the o-CCI. Dr. Rachel provides 940 an access link to the m-CCI via the access module 410. Dr. Rachel's client device and provides 940 the access link to Chris, Zach, Toney and Andrew's client devices using the access module 410. The access link is provided 940 to Chris via email, to Zach via SMS, directly to Andrew via a network message, and to Toney via all methods.

Create Derivative Copy

Figure 10:
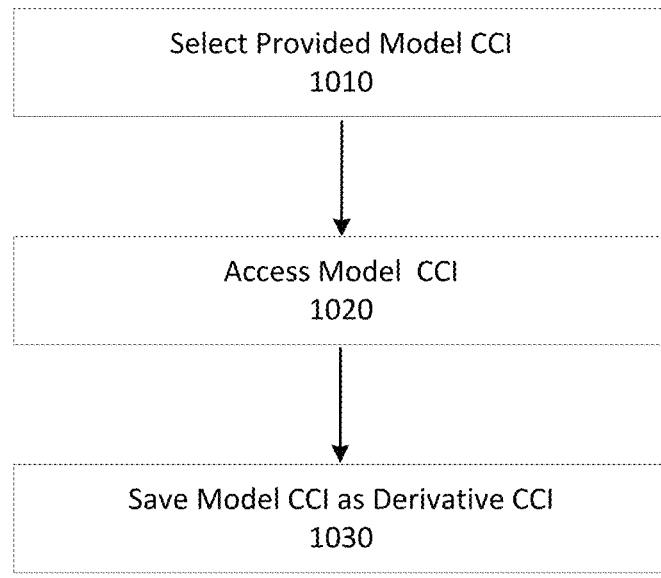
FIG. 10 is a flow chart illustrating the creation of a copy of a collaborative content item, according to one example embodiment.

To continue, FIG. 10 is a flow-chart illustrating the creation 720 of a derivative of a collaborative content item. Recipient client devices can receive the provided m-CCI via the network 110. The recipient client devices can select 1010 the provided m-CCI via the user interface module 202. Selecting the provided m-CCI can provide a recipient device with the unique identifier and content pointer for the m-CCI.

Recipient client devices access 1020 the m-CCI stored in the CCI database 408 via the network 110 using the identification information. In one embodiment, selecting the provided m-CCI can provide a recipient client device access to the m-CCI in the CCI database 408 without necessarily providing all identification information to the recipient client device. The accessed m-CCI can be the version of the o-CCI most recently edited (or created) by the author, or can be an original or unedited o-CCI. In the latter embodiment, the recipient client device can be provided with an option that, when selected, includes a set of edits by the author made to the original o-CCI and stored in the CCI database 408. In some embodiments, the provided m-CCI can provide access to previously stored m-CCI's associated with the identification information (i.e. previous versions of m-CCIs associated with an o-CCI). For instance, upon selecting the access link, a recipient client device can be provided with a list of versions of the o-CCI, and upon selecting a version, the recipient client device is provided with access to the corresponding version of the m-CCI.

In response to selecting the provided m-CCI, the collaborative content management system creates and saves 1030 a derivative copy collaborative content item (i.e., a "d-CCI") of the accessed o-CCI using the copy generator 412. The copy generator 412 accesses the m-CCI and duplicates a state of the m-CCI (such as the current state of the m-CCI or a selected historical state or version of the o-CCI and its associated m-CCI) as a d-CCI for each recipient device selecting the provided m-CCI. The copy generator 412 generates identification information (i.e. unique identifiers and content pointers) for each of the created d-CCIs. In some embodiments, each generated d-CCI is associated with a user account and is only accessible by the associated user account in the future. The copy generator 412 stores each generated CCI in the CCI database.

Returning to the previous example, the recipient client devices of Chris, Zach, Toney, and Andrew receive the access link from Dr. Rachel's client device via the network 110. The recipient client devices all select 810 the access link (for instance, via each device's user interface module 202) and receive the identification information for the "New Virus" m-CCI. The recipient client devices access the "New Virus" m-CCI from the CCI database using the identification information. Using the accessed "New Virus" m-CCI, the copy generator 412 duplicates the "New Virus" m-CCI as a d-CCI and associates the duplicated respective d-CCIs with each user account associated with the recipient client devices. Finally, the copy generator 412 generates identification information (e.g., "New Virus—Toney's Copy," "New Virus—Andrew's Copy," etc.) for each respective d-CCI and saves 1030 the d-CCIs within the CCI database 408.

Edit Derivative Copy

Figure 11:
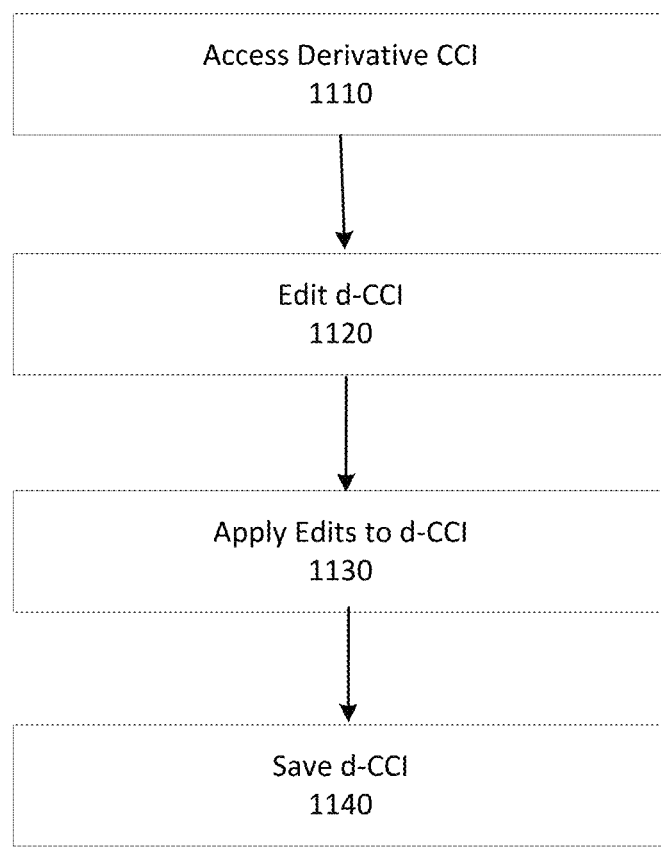
FIG. 11 is a flow chart illustrating the editing of a copy of a collaborative content item, according to one example embodiment.

To continue, FIG. 11 is a flow-chart illustrating the editing of a derivative of a collaborative content item. The recipient client devices which selected 1010 provided m-CCI can access 1110 the d-CCI in the CCI database 408 using the identification information associated with each d-CCI via the network 110. Generally, each recipient client device can only access the d-CCI associated with each user account of the user of the recipient client device. In some embodiments, accessing the d-CCI can create a local copy of each d-CCI on the accessing client device 120 to edit with the CCI editor 404. In another embodiment, accessing the d-CCI allows the accessing client device 120 to use the CCI editor 404 to edit the d-CCI on the CCMS 130 over the network 110.

For example, the recipient client devices of Andrew, Chris, Zach and Toney each access 1110 the "New Virus" d-CCI associated with the user account of the accessing device from the CCI database. For instance, Chris' client device accesses the d-CCI "New Virus—Chris' Copy," Zach's client device accesses the d-CCI "New Virus—Zach's Copy," etc. Continuing with this example, Chris's client device has poor connectivity to the CCMS 130, and as a result creates a local copy of the d-CCI on Chris's client device 120. The client devices of Zach, Andrew, and Toney access the d-CCI on the CCMS 130.

After accessing the d-CCI, the recipient client devices can edit 1120 the d-CCI using the CCI editor 404. Editing the CCI can include: removing original content elements (e.g., deleting text, truncating video, deleting audio snippets, etc.), changing original content elements (e.g., editing text, changing video playback properties, changing audio playback properties, etc.), rearranging original content elements, inserting or adding recipient content elements (e.g., inserting a sentence into a paragraph, splicing a video into an original video, or adding intro audio to a recording, etc.), or appending recipient content elements to the d-CCI. Further, the recipient client devices may access the d-CCI without editing any content elements of the d-CCI. The d-CCI can include content elements from the local content 204 stored on the recipient client device and can include content elements created by the CCI editor 404. The CCI editor 404 can edit a local copy of the d-CCI on a client device 120, or a d-CCI stored on the CCMS 130.

Returning to the example, Toney is an architect specializing in fabricating buildings for disease containment. Toney finds the audio interview provided by Dr. Rachel in the accessed d-CCI unnecessary for building world-class disease research centers, but finds the video of the symptoms and data regarding the spread of the virus useful. Toney has ideas for specific building features that may help contain the virus. Toney's client device edits 1120 the d-CCI "New Virus—Toney's Copy" by deleting the video and inserting notes for future blueprints. Zach is an infectious disease researcher and finds only the data within the d-CCI useful for his experiments. Zach's client device edits 1120 the d-CCI "New Virus—Zach's Copy" by deleting the video and interview recording while adding textual data results and voice recordings of his experiments. Andrew is a medic who is travelling to Asia and plans to assist in treating the disease. After studying the d-CCI, Andrew's client device edits 1120 the d-CCI "New Virus—Andrew's Copy" by adding a video of how to treat some of the symptoms of the disease. Finally, finding all of the information included within the d-CCI useful, Chris's client device does not edit the d-CCI "New Virus—Chris's Copy" at all.

After the d-CCIs have been edited 1120, each recipient client device can apply 1130 the edits to the associated d-CCI at the CCMS 130. In some embodiments, edits are applied after an editing recipient client device selects an option to apply the edits. In other embodiments, the edits are applied to the d-CCI at regular time intervals, in real time as edits are made to the d-CCI, when the d-CCI is saved 1140, or any other time the edits can be applied. After any edits are applied to the d-CCI, the editing recipient client devices 120 can save the d-CCI to the CCI database 408.

For example, Toney's architecture firm requires that his client device auto-saves CCI items at five minute intervals to preserve his designs. Accordingly, Toney's client device automatically applies 1130 his edits to the "New Virus—Toney's Copy" d-CCI on the CCMS and saves 1140 the d-CCI in the CCI database 408 every five minutes. Andrew was able to create three videos on the plane ride to the jungles of Asia. After his plane ride, Andrew's client device selects an option to apply 1130 and save the edits to the "New Virus—Andrew's Copy" d-CCI on the CCMS 130 and saves 1140 the edits to the CCI database 408. Zach's client device is configured automatically to apply 1130 the edits to the "New Virus—Zach's Copy" d-CCI on the CCMS. Zach's client device is also configured to save 1140 a local copy of the d-CCI to the client device rather than saving the edited d-CCI to the CCI database 408.

Author Edit

Figure 12:
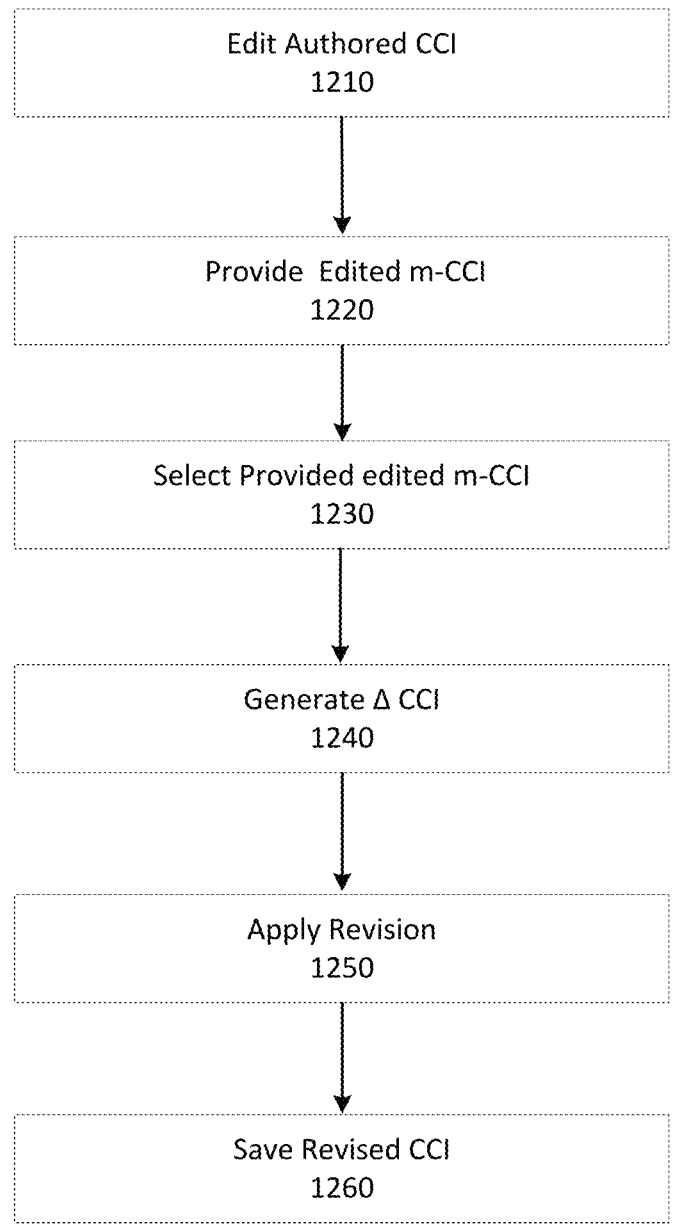
FIG. 12 is a flow chart illustrating the editing of a shared collaborative content item by an author, according to one example embodiment.

To continue, FIG. 12 is a flow-chart describing the editing of a shared collaborative content item by an author 750. The author client device accesses the o-CCI using the identification information from the CCI database 408. The author client device can edit 1210 the o-CCI using the CCI Editor 404. Edits to the o-CCI can include (but are not limited to): removing original content elements, rearranging original content elements, inserting original content elements, or appending original content elements. The author client device can apply the edits to the o-CCI and save the edited o-CCI to the CCI database 408. Similarly to 930 and 940, the author client device can generate and provide an access link to the edited o-CCI 1020 via creation of a m-CCI associated with the edited o-CCI. Similarly to 1010 and 1020, the recipient client device can select the provided m-CCI 1030.

For example, Dr. Rachel continues to explore the jungles of Asia learning more about the virus. Dr. Rachel's client device accesses (from the CCMS 130) and edits 1210 the "New Virus" o-CCI by adding text, video, images, and recordings essential for the curing of the virus using the CCI editor 404. Dr. Rachel's client device applies the edits to the o-CCI and saves the edited o-CCI in the CCI database 408. Dr. Rachel thinks it is essential to get this new information to her colleagues, and her client device generates a new m-CCI and provides 1220 the m-CCI via an access link for the edited m-CCI to the client devices of Zach, Andrew, Toney, and Chris. Zach, Andrew, and Toney select 1230 the provided access link and access the "New Virus" edited o-CCI. In this example, Chris does not select 1230 the access link (and thus does not access the edited m-CCI).

In one embodiment, as this is a subsequent accessing of the same (but edited) m-CCI associated with an edited o-CCI, the CCMS 130 uses the CCI Differentiator 414 to generate 1240 a differential collaborative content item (Δ-CCI) for each client device that accesses the edited m-CCI. A Δ-CCI is a collaborative content item that indicates the differences between the accessed edited m-CCI and the stored d-CCI for each accessing client device. Generally, a Δ-CCI is calculated using the stored d-CCI associated with a user account that is associated with the client device accessing the stored d-CCI.

Recipient client devices are provided with the Δ-CCI and may use the CCI revision module 420 to apply 1250 revisions. Applying 1250 revisions can include selecting which content elements of the original content elements and recipient content elements to maintain and which to discard within the Δ-CCI. This allows the recipient client devices to maintain recipient content elements within the stored d-CCI that are not present in the accessed edited m-CCI. Additionally, this allows recipient client devices to prevent new original content elements present in the edited m-CCI from being incorporated into the d-CCI. After applying the revisions, the revised collaborative content item can be saved 1060 as the revised collaborative content item (d-CCI).

Continuing with the previous example, Toney is working on a set of blueprints for a building design. Toney's client device accesses the edited "New Virus" d-CCI and is provided with a Δ-CCI "New Virus vs. New Virus—Toney's Copy" that indicates the differences between the accessed edited m-CCI (reflecting Dr. Rachel's edits to the o-CCI) and the stored d-CCI. Toney realizes that changes to the blueprints are necessary after seeing the new content elements Dr. Rachel provided in the edited m-CCI. Toney's client device applies 1250 the revisions by deleting all of the previous building designs from the d-CCI and saves 1260 the "New Virus—Toney's Copy" d-CCI to begin the blueprint design process from scratch. Andrew's client devices accesses the edited "New Virus" d-CCI and is provided with a Δ-CCI "New Virus vs. New Virus—Andrew's Copy" that indicates the differences between the accessed edited m-CCI and the stored d-CCI. Andrew's client device selects to apply the revisions 1250 by appending all of the new content from the edited m-CCI to the end of the stored d-CCI, and saves 1260 the "New Virus—Andrew's Copy" d-CCI. Zach's client device accesses the edited "New Virus" and is provided with a Δ-CCI "New Virus vs. New Virus—Zach's Copy" that indicates the differences between the accessed edited m-CCI and the stored d-CCI. Zach's client device selects to delete all of the new content from the edited m-CCI and save 1260 the "New Virus—Zach's Copy" d-CCI.

In other embodiments, selecting 1230 the edited m-CCI does one or more of the following: applies the edits of the edited o-CCI to the stored d-CCI (i.e., applies only the new original content elements), creates a new d-CCI that is a copy of the edit o-CCI (i.e. replaces the stored d-CCI), presents the new edits included within the edited o-CCI to a user of the recipient client device for incorporation on a case-by-case basis, or performs any other suitable action with regards to the original content elements that are added, rearranged, removed or inserted from the edited o-CCI into the stored d-CCI.

Alternative Configurations

Moving forward, several more specialized aspects of collaboration events will be described. These collaboration events can use elements of the collaborative content management system 130 and aspects of the processes of FIGS. 7-12 in unique configurations.

Metadata Stripping Event

In one configuration of a collaboration event, when a recipient client device selects the provided m-CCI, accesses the m-CCI, and the CCMS 130 creates a d-CCI, the settings and security module 416 can remove any sensitive internal metadata from the d-CCI. The settings and security module 416 can remove the metadata from fields in the m-CCI associated with sensitive internal metadata, portions of metadata identified by the author client device for removal, particular types of metadata (such as social security numbers, account numbers, phone numbers, and the like), or algorithmic identification and removal by the settings and security module (e.g. keyword detection, etc.). For example, Dr. Rachel's home phone number is embedded in an identification field of the "New Virus" o-CCI. The settings and security module 416 can remove Dr. Rachel's home phone number such that it is not included in Toney's d-CCI.

In a similar configuration, when a recipient client device selects the provided m-CCI, accesses the m-CCI, and the CCMS 130 creates a d-CCI, the settings and security module 416 can remove any content elements from the d-CCI that include sensitive material. The settings and security module 416 can remove sensitive information from fields in the m-CCI, portions of sensitive information identified by the author client device for removal, particular types of sensitive information (such as social security numbers, account numbers, phone numbers, and the like), or algorithmic identification and removal by the settings and security module (e.g. keyword detection, etc.).

Reverse Publication Event

In one configuration of a collaboration event, the author client device can select content elements from d-CCIs to incorporate into the o-CCI or m-CCI. The author client device can access a d-CCI from the CCI database 408 and use the collaborative content item editor 404 to add recipient content elements from the accessed d-CCI to the o-CCI or m-CCI. Alternatively, the author client device can access a d-CCI, determine the difference between the d-CCI and the o-CCI (or m-CCI) using the CCI differentiator 414, and apply revisions to the o-CCI (or m-CCI) to create an d-CCI. One skilled in the art will note that this principal can be expanded to indicate that any client device can act as an author or a recipient.

For example, a prominent musician has previously authored an o-CCI, created an associated m-CCI, and provided the model collaborative content item with the instrumental version of his latest track from the music studio. The musician browses d-CCIs created from his o-CCI (i.e. the m-CCI associated with his o-CCI) and discovers a d-CCI with a set of vocals for the track that he enjoys. The musician accesses the d-CCI and revises the o-CCI to include the vocals from the d-CCI.

Real-Time Author Edit Event

In one configuration of a collaboration event, after selecting 1010 provided m-CCI, the recipient client device creates a d-CCI that is updated with author edits in real-time as the author edits the o-CCI. In this configuration, original content elements are pushed to the associated m-CCI and then to the d-CCI as the o-CCI is edited by the author in real-time. The real-time edits can use the CCI differentiator 414 such that recipient content elements that are added to the d-CCI are not affected by the real-time original content elements that are propagated to the recipient client device. Similarly to above, each recipient device only see edits to the d-CCI made by the accessing recipient device, i.e. each recipient device can only edit and access the d-CCI associated with the recipient device.

For example, Toney wants to share his ideas for building design and construction in real-time. Toney's client device generates and provides a real-time access link for an o-CCI via an m-CCI to recipient client devices. As Toney edits his building plans, Toney's client device adds original content elements to the o-CCI, which are propagated in real-time to the m-CCI and then to client devices that select the real-time access link. The recipient client devices can simultaneously edit the d-CCI with recipient content elements as the original content elements are edited into the d-CCI. The original content elements can be rejected or accepted by the recipient client device to maintain the recipient content elements in the d-CCI.

Selective Metadata Viewing Event

In one configuration of a collaboration event, when accessing a collaborative content item, the client device can select which metadata is accessed and shown in the CCI Editor 404 using the metadata module 418. The client device can be an author client device or recipient client device. In one example, a novelist has finally provided his long awaited novel and associated comments to his editor as an access link to an o-CCI of the novel. The editor's client device selects the access link and is provided with a d-CCI. The editor wishes to view the novel with none of the authors comments while she makes her first edits to the novel. The editor's client device can use the metadata module 418 to filter the author's comments when reading the d-CCI. The editor edits the d-CCI with recipient content elements of videos from a TV show showing similar scenes of the novel to compare them.

Tagging, Searching, and Analytics in Collaboration Events

As described above, the collaborative content management system include a metadata tagging architecture within the metadata module 418. Each collaborative content item can have any number of associated metadata tags. The metadata tags can describe any aspect of the collaborative content item and its associated metadata. Client devices 120 can search the content management system for collaborative content items associated with a specific metadata tag. The content management system 100 can provide collaborative content items associated with the metadata tag and the searching client device 120 can request an access link to any of the searched collaborative content items.

In this configuration, the metadata tags can be used to generate analytics associated with each collaborative content item. The analytics can provide feedback to author client devices as to how recipient client devices use the collaborative content item (e.g. number of edits, number of revisions, number of shares, etc.). Further, the analytics can provide feedback to author client devices as to what type of user account is accessing and editing the collaborative content item (e.g. sex, age, ethnicity, interests, etc.). Additionally, the collaborative content management system 130 can suggest collaborative content items to client devices based on the analytics associated with the client device using the notification server 422 and the notification database 424.

Collaborative Editing Event

In one configuration of a collaboration event, rather than only a singular client device being able to access, edit and view its associated d-CCI, a group of client devices can collaboratively edit the d-CCI. In this configuration, the group of client devices can all access, edit, and view the associated d-CCI. However, the group of client devices cannot access, edit, or view other d-CCIs (e.g., d-CCIs associated with other client devices or groups of client devices, with other user accounts, and the like), nor can other client devices access edit or view the group's d-CCI.

Notifications

In one configuration of a collaboration event, any client device may send notifications to any other client devices using the notification server 422 and notification database 424. In some cases, the notification can be triggered using specific sets of alphanumeric characters associated with client devices or user accounts (e.g. "@userAccount Notice1," or "@userDevice Notice2," etc.).

Commenting

In various configurations of a collaboration event, a user can comment on collaborative content items on different levels (e.g., the file level, document level, etc.) based on a set of comment rules. In these configurations, the comments can be visible to other users of the CCMS based on the set of comment rules. The set of comment rules can identify users that are allowed to comment on collaborative content items, can identify collaborative content items that users can comment on, can specify users that can view particular comments, can flag comments for removal or maintenance during the creation of derivative or model collaborative content items, can enable or disable commenting for particular sections of a collaborative content item, and the like.

In some implementations, an "@modelDoc" or "@originalDoc" primitive can specify that all users that have creator access to a model collaborative content item can access the comment. In some cases, the comment with the o-CCI mention can be reflected back to the corresponding o-CCI. For example, a copy of the comment can be added to the o-CCI and be displayed in the o-CCI in a manner similar to the comment in the d-CCI (e.g., if the comment with the o-CCI mention is attached to a particular text string in the d-CCI it can be attached to the same text string (if it exits) in the o-CCI).

In some configurations, the set of comment rules can be maintained within metadata associated with the collaborative content item. In an example, the set of comment rules can specify that only comments in a d-CCI with a "@AuthorName" modifier will be visible to the author (e.g., will be included within a corresponding o-CCI of the author). In another example, the set of comment rules can include a master user that is able to comment on any derivative collaborative content item and regular users that are only able to comment on collaborative content items corresponding to the each regular user.

Pushed Author Edits

In one configuration of a collaboration event, each time an author edits a previously selected o-CCI, the CCMS 130 can use the notification server 422 and notification database 424 to notify recipient client devices that have previously selected provided m-CCI associated with the o-CCI. The notification can include metadata indicating that the author client device edited the o-CCI from which the stored d-CCI was created and can offer a prompt to update the stored d-CCI using the edited an edited m-CCI reflecting the changes of the o-CCI. In a similar configuration, recipient client devices that have previously selected provided m-CCI and created a d-CCI can opt-in to an automatic update. This automatic update can automatically apply edits of the o-CCI, to an edited m-CCI which is then propagated to the d-CCI of the opted-in recipient device without requiring an explicit input from a user of the recipient client device. The automatic update feature can wholly replace the d-CCI with the edited o-CCI or, alternatively, maintain any amount of recipient content elements of the d-CCI when applying the edits from the edited m-CCI to the d-CCI.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
    storing, by a collaborative content management system, an original collaborative content item created by an author;
    creating, by the collaborative content management system, a model collaborative content item from the original collaborative content item using a set of model collaborative content item rules;
    receiving, at the collaborative content management system, a first request to create, based on the model collaborative content item, a first derivative collaborative content item from a first collaborative content management system account, and a second request to create a second derivative collaborative content item from a second collaborative content management system account, the first request including a first account identifier for the first collaborative content management system account, and the second request including a second account identifier of the second collaborative content management system account;
    creating, by the collaborative content management system, the first derivative collaborative content item and the second derivative collaborative content item, wherein metadata of the first derivative collaborative content item includes the first account identifier, wherein metadata of the second collaborative content item includes the second account identifier, and wherein the first and second derivative collaborative content items are:
        generated by duplicating the model collaborative content item,
        stored on the collaborative content management system, and editable by the respective collaborative content management system account that matches the account identifier included in the respective metadata of the respective derivative collaborative content item;

receiving, at the collaborative content management system, a first set of edits to the first derivative collaborative content item, and a second set of edits to the second derivative collaborative content item, the first set of edits being received from the first account, and the second set of edits being received from the second account;

applying, by the collaborative content management system, the first set of edits to the first derivative collaborative content item, wherein the second set of edits are not applied to the first derivative collaborative content item based on the second set of edits not being from the first account; and applying the second set of edits to the second derivative collaborative content item, wherein the first set of edits are not applied to the second derivative collaborative content item based on the first set of edits not being from the second account.

2. The method of claim 1 wherein the original collaborative content item comprises metadata describing the original collaborative content item, and wherein creating the model collaborative content item comprises:

generating metadata describing the model collaborative content item using the set of model collaborative content item rules, the set of model collaborative content item rules identifying how the metadata describing the model collaborative content item is generated using the metadata describing the original collaborative content item.

3. The method of claim 2, wherein the metadata describing the model collaborative content item is generated by:

identifying a set of protected metadata describing the author; and masking the set of protected metadata from the modified collaborative content item when generating the modified collaborative content item.

4. The method of claim 2, wherein modifying metadata associated with the model collaborative content item comprises:

adding a set of classification metadata to the modified collaborative content item, the classification metadata identifying one or more characteristics of the modified collaborative content item.

5. The method of claim 1, wherein the first derivative collaborative content item is created in response to a first user of the first collaborative content management system account selecting a link corresponding to the model collaborative content item, and wherein the link is a visual representation of the location of the model collaborative content item in the collaborative content management system.

6. The method of claim 5, wherein the link corresponding to the model collaborative content item is provided as a hyperlink within an interface of the first collaborative content management system account such that, when the link is selected, the first derivative collaborative content item is created such that it corresponds to and is accessible by the first collaborative content management system account.

7. The method of claim 1 further comprising:

attributing at least a portion of the original collaborative content item to the author with an author attribution; and in response to creating the model collaborative content item, maintaining the author attribution within the model collaborative content item.

8. The method of claim 1, wherein storing the original collaborative content item comprises:

creating a set of document tags corresponding to the original collaborative content item, the document tags representing content of the collaborative content item; and storing the document tags such that the document tags correspond to the original collaborative content item.

9. The method of claim 8, wherein the set of document tags are created using metadata describing the original collaborative content item.

10. The method of claim 8, further comprising creating additional document tags corresponding to the original collaborative content item based on input from the author.

11. The method of claim 8, wherein the original collaborative content item is indexed within the collaborative content management system with the set of document tags, and wherein the collaborative content management system is searchable for collaborative content items based at least in part on the set of document tags.

12. The method of claim 1 further comprising:

creating, by the collaborative content management system, an additional model collaborative content item by modifying the first derivative collaborative content item using a set of second model collaborative content item rules to create the additional model collaborative content item.

13. The method of claim 1, further comprising:

suggesting, by the collaborative content management system, the model collaborative content item to a suggested collaborative content management system account based on a first set of metadata describing the model collaborative content item and a second set of metadata describing the suggested collaborative content management system account.

14. The method of claim 1, further comprising:

receiving, by the collaborative content management system, a comment associated with the first derivative collaborative content item; and in response to the comment including an identification of the author, applying, by the collaborative content management system, the received comment to the model collaborative content item such that the comment is accessible to the author of the original collaborative content item.

15. The method of claim 1, wherein the metadata of the first derivative collaborative content item includes an author identifier for a collaborative content management account of the author, wherein the metadata of the second derivative collaborative content item includes the author identifier, the method further comprising:

receiving, at the collaborative content management system from the collaborative content management account of the author, a set of author edits to the original collaborative content item;

applying, by the collaborative content management system, the set of author edits to the first derivative collaborative content item based on the author identifier matching metadata of the first derivative collaborative content item such that the first derivative collaborative content item includes the first set of edits and the set of author edits, and does not include the second set of edits; and applying, by the collaborative content management system, the set of author edits to the second derivative collaborative content item based on the author identifier matching metadata of the second derivative collaborative content item such that the second derivative collaborative content item includes the second set of edits and the set of author edits, and does not include the first set of edits.

16. A computer system comprising:

at least one processor;

a memory storing instructions that, when executed by the at least one processor, cause the processor to:

store an original collaborative content item created by an author;

create a model collaborative content item from the original collaborative content item using a set of model collaborative content item rules;

receive a first request to create a first derivative collaborative content item from a first collaborative content management system account, and a second request to create a second derivative collaborative content item from a second collaborative content management system account, the first request including a first account identifier for the first collaborative content management system account, and the second request including a second account identifier of the second collaborative content management system account;

responsive to receiving the first and second requests, create the first derivative collaborative content item and the second derivative collaborative content item using the model collaborative content item, wherein metadata of the first derivative collaborative content item includes the first account identifier, wherein metadata of the second collaborative content item includes the second account identifier, and wherein the first and the second derivative collaborative content items are:

generated by duplicating the model collaborative content item, stored on the collaborative content management system, and editable by the collaborative content management system account that matches the account identifier included in the respective metadata of the respective derivative collaborative content item;

receive a first set of edits for the first derivative collaborative content item and a second set of edits for the second derivative collaborative content item, the first set of edits being received from the first account, and the second set of edits being received from the second account;

apply the first set of edits to the first derivative collaborative content item wherein the second set of edits are not applied to the first derivative collaborative content item based on the second set of edits not being from the first account; and apply the second set of edits to the second derivative collaborative content item, wherein the first set of edits are not applied to the second derivative collaborative content item based on the first set of edits not being from the second account.

17. The computer system of claim 16 wherein the original collaborative content item comprises metadata describing the original collaborative content item, and wherein the instructions, when executed by the at least one processor, further cause the processor to:

generate metadata describing the model collaborative content item using the set of model collaborative content item rules, the set of model collaborative content item rules identifying how the metadata describing the model collaborative content item is generated using the metadata describing the original collaborative content item.

18. A method for collaborative editing in a collaborative content management system comprising a plurality of user accounts, comprising:

receiving a request from each of a plurality of users to generate a derivative collaborative content item by duplicating a model collaborative content item, each received request including an identifier for the model collaborative content item and an account identifier corresponding to an account of each of the plurality of users;

for each of the plurality of users, generating a derivative collaborative content item stored within the collaborative content management system and accessible via the user account associated with the user, wherein metadata of the derivative collaborative content item includes the account identifier of the account of the corresponding user;

receiving, from one or more users of the plurality of users, at least one edit to the derivative collaborative content item corresponding to the user; and for each received edit, applying the received edit to the derivative collaborative content item corresponding to the user from whom the edit was received based on the account identifier corresponding to the account of the user from who the edit was received matching the account identifier included in the metadata of the respective derivative collaborative content item, such that edits applied to a first derivative collaborative content item corresponding to a first account of a first user of the plurality are not applied to a second derivative collaborative content item corresponding to a second account of a second user based on the first set of edits not being from the second account, and edits applied to the second derivative collaborative content item corresponding to the second account are not applied to the first derivative collaborative content item based on the second set of edits not being from the first account.

19. The method of claim 18, further comprising:

providing, to the plurality of users and from an author of the model collaborative content item, an access link that when selected generates the derivative collaborative content item.

\* \* \* \* \*